US008577583B2

(12) United States Patent
Kernwein et al.

(10) Patent No.: US 8,577,583 B2

(45) Date of Patent: Nov. 5, 2013

(54) METHOD FOR OPERATING A GLOW PLUG WITH THE ENGINE RUNNING

(75) Inventors: Markus Kernwein, Bretten (DE); Joerg Stoeckle, Ludwigsburg (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 713 days.

(21) Appl. No.: 12/857,922

(22) Filed: Aug. 17, 2010

(65) Prior Publication Data

US 2011/0041818 A1 Feb. 24, 2011

(30) Foreign Application Priority Data

Aug. 19, 2009 (DE) ......................... 10 2009 038 098

(51) Int. Cl.

*G06F 19/00* (2011.01)
*H05B 1/02* (2006.01)
*F02P 19/02* (2006.01)

(52) U.S. Cl.

USPC ......... 701/113; 123/145 A; 219/260; 219/492

(58) Field of Classification Search

USPC ............. 123/145 A, 179.6, 179.21; 219/260, 219/270, 492; 701/102, 113

See application file for complete search history.

(56) References Cited

U.S. PATENT DOCUMENTS

| | | | | |
|---|---|---|---|---|
| 4,516,543 | A * | 5/1985 | Abe et al. | 123/179.21 |
| 4,939,347 | A * | 7/1990 | Masaka et al. | 219/492 |
| 6,878,903 | B2 * | 4/2005 | Duba | 219/270 |
| 7,487,753 | B2 * | 2/2009 | Gotou et al. | 123/145 A |
| 7,500,457 | B2 * | 3/2009 | Hiramatsu | 123/145 A |
| 8,153,936 | B2 * | 4/2012 | Kernwein et al. | 219/260 |
| 8,280,609 | B2 * | 10/2012 | Ehlert | 701/102 |
| 2006/0289425 | A1 | 12/2006 | Serra et al. | |
| 2007/0240663 | A1 | 10/2007 | Hiramatsu | |
| 2009/0008378 | A1 | 1/2009 | Kernwein et al. | |
| 2009/0012695 | A1 | 1/2009 | Kernwein et al. | |

FOREIGN PATENT DOCUMENTS

| | | | |
|---|---|---|---|
| DE | 10 2006 048 225 | A1 | 4/2008 |
| GB | 2464128 | A | 4/2010 |
| GB | 2466275 | A | 6/2010 |

* cited by examiner

*Primary Examiner* — Willis R Wolfe, Jr.

(57) ABSTRACT

The invention relates to a method for operating a glow plug with the engine running, wherein an effective voltage is generated from a vehicle electrical system voltage by pulse width modulation, the effective voltage is applied to the glow plug and changed as a function of engine parameters, a target value of the effective voltage that is dependent on the engine parameters and to which the effective voltage is changed is specified, a maximum increment for a change of the actual value of the effective voltage in at least one direction is specified, and a change of the actual value in at least one direction to a target value that deviates from the actual value by more than the maximum increment is carried out in several steps. The invention further relates to a controller which carries out such a method during operation.

16 Claims, No Drawings

METHOD FOR OPERATING A GLOW PLUG WITH THE ENGINE RUNNING

The invention relates to a method for operating a glow plug with the engine running, wherein an effective voltage is generated from the vehicle electrical system voltage by pulse width modulation.

Glow plugs are used in diesel engines for starting purposes and, with the engine running, they are used to support the combustion process. While the energy demand of glow plugs is lower while driving than during the pre-heating phase for starting the engine because the glow plugs have already reached the operating temperature range, glow plugs also withdraw considerable electrical power from the vehicle electrical system during such a post-heating phase. The power demand that the glow system places on the vehicle generator and the vehicle battery is subject to short-term fluctuations because the heat emission of the glow plug, and consequently the operating voltage required for maintaining an optimal operating temperature, depend on different engine parameters, such as the engine speed.

It is an object of the invention to identify a way as to how the load of the vehicle electrical system associated with the operation of glow plugs can be reduced with the engine running.

SUMMARY OF THE INVENTION

A method for operating a glow plug with the engine running is provided wherein an effective voltage, which is applied to the glow plug and changed as a function of one or more engine parameters, is generated from a vehicle electrical system voltage by pulse width modulation, a target value of the effective voltage that is dependent on engine parameters and to which the effective voltage is changed is specified, a maximum increment is specified for a change of the actual value of the effective voltage in at least one direction, and a change of the actual value in at least one direction to a target value that deviates from the actual value by more than the maximum increment is carried out in several steps.

DETAILED DESCRIPTION

In a method according to the invention, a target value, which is dependent on the engine speed, is specified for the effective voltage that is applied to the glow plug. Since the heat emission of a glow plug, and consequently also the effective voltage required for maintaining an optimal plug temperature, depend on the engine state and the engine speed, in this way an efficient operation of the glow plug can be achieved, which not only ensures good combustion, but also prevents an unnecessary load on the glow plug.

Particularly during a cold-running phase, after starting the engine, irregular engine operation may occur, during which the rotational speed and the fuel quantity that is burned can change very quickly and repeatedly within a wide range. During irregular engine operation, the target value of the effective voltage is subject to relatively large short-term fluctuations. Changing the actual value of the effective voltage promptly, that is, during the next voltage pulse, to the target value results in accordingly irregular power demands on the vehicle electrical system, which can prompt an erratic state of the overall engine/vehicle electrical system as a result of regeneration, or can maintain it in such an erratic state for an extended period.

By specifying a maximum increment for a change of the actual value of the effective voltage to the target value in at least one direction, drastic changes in the effective voltage are delayed. In this way, regeneration can be reduced, and the irregular load placed on the vehicle electrical system as well as the engine can be lowered on an overall basis. In the method according to the invention, a change of the actual value to a target value that deviates from the actual value by more than the maximum increment in at least one direction is carried out in several steps.

In order to reduce regeneration, it is sufficient to specify a maximum increment for a change of the actual value of the effective value in a single direction, that is, an increase or a decrease. Particularly advantageous results can be achieved if a maximum increment is specified for both directions, that is, for both an increase and for a decrease of the actual value. The maximum increment for an increase and the maximum increment for a decrease are preferably equally large, however they may also deviate from each other.

If a maximum increment is only to be specified for a change of the effective voltage in one direction, such as to simplify control, it is advantageous to specify a maximum increment for an increase. In a method according to the invention it is therefore preferred to specify a maximum increment at least for an increase of the actual value of the effective voltage, and an increase of the actual value to a target value that exceeds the actual value by more than the maximum increment is carried out in several steps. In this way, a large sudden increase in the effective voltage can advantageously be avoided. A sudden increase in the effective voltage results in a particularly disadvantageous load on the vehicle electrical system, while a sudden decrease in the effective voltage is less critical for the vehicle electrical system.

The maximum increment is preferably specified as a function of the engine state, for example, as a function of the engine speed. It is particularly advantageous to specify the maximum increment as a function of the engine speed and the number of crankshaft revolutions since the engine was started. In addition, other engine parameters, such as the engine load, can also be used for defining the maximum increment. The maximum increment can be adjusted, for example, by way of a characteristic curve, a map, or a mathematical model. In principle, it is also possible to specify the maximum increment as a fixed value.

The pulse width modulation for generating the effective voltage is preferably carried out in that a switch connecting the glow plug to the vehicle electrical system, such as a power transistor, is actuated twice within a defined period. Within a defined period, the switch is therefore closed once and opened once. The sequence of closing and opening the switch can be selected for each period at will, so that, for example, a voltage pulse starting in a first period does not necessarily have to end in the first period. It is also possible that a voltage pulse starts in a first period, but does not end until a second period. In this second period then, a further voltage pulse is started after a pause. The time proportion of the period during which the switch is closed and therefore the vehicle electrical system voltage is present at the glow plug is referred to as the duty cycle. With a constant vehicle electrical system voltage, the effective voltage can be calculated as the square root of the product of the duty cycle and the vehicle electrical system voltage square.

It is also possible, per se, to employ a pulse width modulation method for generating the effective voltage, wherein the period duration for adjusting a desired duty cycle is variable, for example the duration of the voltage pulse remains constant and, instead, the duration of the pauses between the pulses is changed. However, as was already mentioned, the pulse width modulation is preferably carried out such that the period duration is kept constant for an extended time period. It is certainly possible to change the period duration incrementally, for example, the period duration can be cut in half when a defined rotational speed threshold has been reached.

The maximum increment is preferably specified as the maximum possible change of the duty cycle over the course of a specified number of periods. It is possible, for example, that a change in the duty cycle for adapting the actual value to the target value is only possible after a specified number of periods, such as two or three periods. The maximum increment, however, is preferably specified as the maximum possible change of the duty cycle between two consecutive periods. This means that the duty cycle can be changed between one period and the subsequent period.

According to a further advantageous refinement of the invention, the maximum increment limits the speed at which the effective voltage can be changed to no more than 0.1 V per period, preferably to no more than 0.05 V, particularly to no more than 0.01 V per period. As a result of the maximum increment, advantageously a threshold, that is, a maximum value or a minimum value, can be specified for the first time derivative of the effective voltage. The maximum increment, that is, the maximum permitted change in the effective voltage during a step, divided by the time duration of a step produces the maximum permitted amount of the value of the first time derivative of the effective voltage. As a result of the maximum increment, in the case of an increase, a maximum value of the first time derivative of the effective voltage is specified. Because the first time derivative is negative when the effective voltage is reduced, a maximum value of the increment permitted during a reduction is specified by a minimum value of the derivative. Since a value of the effective voltage in each case is only defined for one period of the pulse width modulation, the first derivative of the effective voltage of the time can only be formed numerically, for example, in that the difference between the values of the effective voltage of two consecutive periods is determined and divided by the period duration.

In a method according to the invention, the target value is preferably specified as a function of the engine speed and/or the number of crankshaft revolutions since the engine was started. In addition to the engine speed, the target value may depend on additional variables, such as the engine load or a measured temperature, such as the cooling water temperature or the ambient temperature. The target value can be determined by way of a characteristic curve or a map. It is also possible, for example, to calculate the target value from the engine speed and possibly other variables by using a mathematical model.

The method according to the invention can be applied to glow plugs of any arbitrary type, particularly to ceramic and metallic glow plugs.

A method according to the invention can be carried out by using a glow plug controller or a software core in another controller. Such a controller may correspond to commercially available glow plug controllers in terms of the hardware thereof, so that a detailed description is not required. A program is stored in a memory of the controller, so that the controller can carry out the method described above during operation. The controller has a signal input for a signal which is dependent on the engine rotational speed. On the basis of this signal and possibly other signals present at further signal inputs, the controller calculates a target value for the effective voltage that is applied to the particular glow plug. The effective voltage is generated by the controller by way of pulse width modulation of the vehicle electrical system voltage, for example, in that the controller has a control output to which a transistor switch, preferably a field effect transistor, such as a MOSFET, is connected. This switch can be actuated twice by the controller during a period of the pulse width modulation, so that during part of the period the vehicle electrical system voltage is present at the glow plug and during the remaining part of the period the switch is open and the glow plug is therefore decoupled from the vehicle electrical system.

What is claimed is:

1. A method for operating a glow plug with the engine running, the method comprising:

generating, from a vehicle electrical system voltage by pulse width modulation, an effective voltage, which is applied to the glow plug and changed as a function of one or more engine parameters;

specifying a target value of the effective voltage that is dependent on engine parameters and to which the effective voltage is changed; and specifying in several steps a maximum increment for a change of the actual value of the effective voltage in at least one direction, and a change of the actual value in at least one direction to a target value that deviates from the actual value by more than the maximum increment.

2. A method according to claim 1, wherein a maximum increment is specified for a decrease of the actual value, and a decrease of the actual value to a target value which is lower than the actual value by more than the maximum increment is carried out in several steps.

3. A method according to claim 1, wherein the maximum increment is specified as a function of the engine state.

4. A method according to claim 1, wherein the maximum increment is specified as a function of the engine speed.

5. A method according to claim 1, wherein the maximum increment is specified as a function of the number of crankshaft revolutions since the engine was started.

6. A method according to claim 1, wherein the maximum increment is specified as a function of the engine load.

7. A method according to claim 1, wherein the maximum increment is specified as a characteristic curve, map or mathematical model.

8. A method according to claim 1, wherein the maximum increment specifies a threshold for the first derivative of the effective voltage after the time.

9. A method according to claim 1, wherein the target value is specified as a function of the engine load.

10. A method according to claim 1, wherein the target value is specified as a function of the measured temperature.

11. The method according to claim 1, wherein a maximum increment is specified for an increase of the actual value of the effective voltage, and an increase of the actual value to a target value which is higher than the actual value by more than the maximum increment is carried out in several steps.

12. A method according to claim 11, wherein the maximum increment for an increase of the actual value and the maximum increase for a decrease of the actual value are equal.

13. A method according to claim 1, wherein the pulse width modulation is carried out in that a switch connecting the glow plug to the vehicle electrical system is actuated twice during an established period.

14. The method according to claim 13, wherein the maximum increment is specified as the maximum possible change of the duty cycle over the course of a specified number of periods.

15. The method according to claim 13, wherein the maximum increment is specified as the maximum possible change of the duty cycle between two consecutive periods.

16. A method according to claim 13, wherein the maximum increment limits the speed at which the effective voltage is changed to no more than 0.1 V per period.

* * * * *